Dec. 16, 1947.  A. THORNGREN  2,432,949
RIVET AND METHOD OF APPLYING SAME
Filed April 21, 1945

Alfred Thorngren
INVENTOR.

BY James M. Clark
His Patent Attorney

Patented Dec. 16, 1947

2,432,949

UNITED STATES PATENT OFFICE 2,432,949

RIVET AND METHOD OF APPLYING SAME

Alfred Thorngren, West Los Angeles, Calif., assignor to Douglas Aircraft Company, Inc., a corporation of Delaware Application April 21, 1945, Serial No. 589,551

4 Claims. (Cl. 218—19)

The present invention relates to rivets and more particularly to hollow or tubular rivets, and the method and means for their application.

This invention relates to a rivet of the hollow blind type particularly for use in fastening or restricting two or more pieces of material against relative movement in those areas or work assemblies where access is available from one side only. Such inaccessible portions are frequently met with in aircraft manufacture and assembly wherein it is frequently impossible to use a bucking tool in combination with the rivet upsetting means. Many of the difficulties and disadvantages previously met with in the use of hollow blind rivets and their methods of application have been largely overcome by the present invention in which a hollow tubular rivet blank is swaged upon the recessed portion of a conic-pointed mandrel or driving pin which upon removal upsets the inner end of the rivets stem into a crimped condition to thereby fasten the riveted materials together with a clamping action without leaving any part of the mandrel or rivet on the inside of the structure. The mandrel is capable of further use after its removal and whenever it may be necessary, the tubular rivet can readily be drilled out without injury to the hole or structure. The present rivet is also distinctly advantageous for the purpose of temporarily tacking riveted structures together before the final rivets are installed.

It is accordingly a major object of the present invention to provide a hollow or tubular rivet capable of being readily installed from one side of the work only in inaccessible areas where upsetting of the rivet cannot be accomplished by use of the conventional bucking tools. A further object resides in the provision of a hollow blind rivet of relatively light weight, which is easily installed and presents good strength qualities. It is another object of this invention to provide a rivet which is particularly adapted for use where it is necessary to attach fabric to a metal structure such as in the manufacture of airplane control surfaces and the like.

It is a still further object to provide a hollow blind rivet which can be readily drilled out of the structure when it is desired to remove the same without incurring injury to the hole drilled in the structure. A further object of importance is the provision of such a rivet in which the gripping action takes place in a direction normal to the sheets being joined. Other objects, advantages and uses of the present invention will become apparent to those skilled in the art after reading the present description and the accompanying drawings forming a part hereof, in which.

Figure 1:
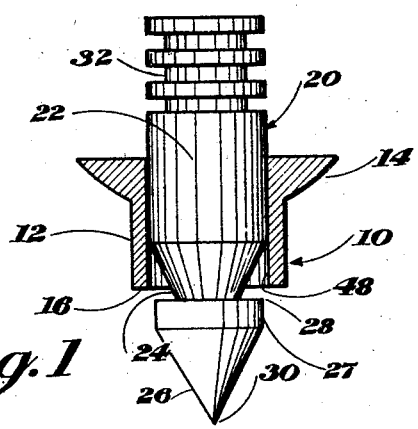
Fig. 1 is a cross-sectional view of a preferred form of my tubular rivet with its upsetting mandrel positioned therein prior to their being attached together.

Referring now to Fig. 1, a preferred form of the present rivet, indicated by the numeral 10, comprises essentially a hollow tubular stem or shank 12 and a countersunk head 14. As shown in the drawings, the outer face of the head 14 is flat or formed transversely to the axis of its central bore, and the underside of its head portion is shaped to the curvature of a dimpled hole such that the outer face of the head lies flush with the surface of the material to be fastened. The inner end of the rivet stem at 16 is similarly formed within a plane transverse to the central axis of the rivet and parallel to the outer face of the head portion.

A mandrel 20 having a cylindrical body or shank portion 22 has an outside diameter which is slightly less than the inside diameter of the tubular rivet blank. Adjacent its inner end the mandrel is provided with a frusto-conical, tapered or grooved portion of its shank at 24, beyond which it is provided with a conic portion 26 terminating in the point or apex of the cone at 30, having a transverse shoulder portion at 28 and an intermediate cylindrical portion at 27. The upper or outer portion of the mandrel is provided with a plurality of annular grooves or recesses 32 into which a suitable plier type tool may be inserted for driving or setting the rivet. The rivet blank 10 and its mandrel 20 are positioned in the relative relationship shown in Fig. 1 in which the mandrel fits snugly within the rivet. They are then placed within a suitable machine or other device which swages or forms the inner portions of the rivet shank into a part conic or taper portion 18 in which it is in intimate contact with the frusto-conical portion 24 of the mandrel, to thereby form a complete unit as shown in Fig. 2.

Figure 2:
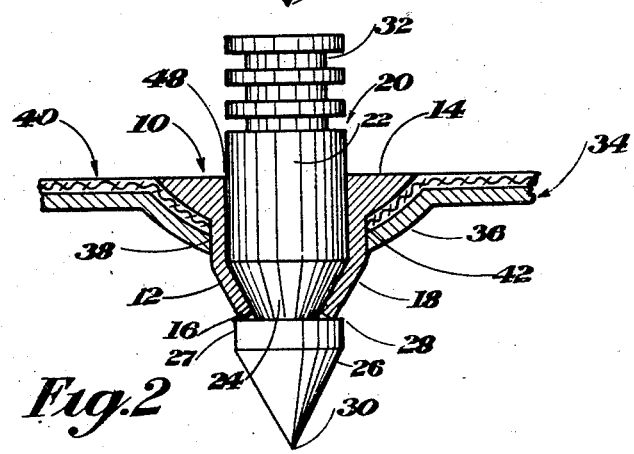
Fig. 2 is a similar cross-sectional view of the rivet in its swaged relationship upon the mandrel and with the combination inserted within an opening in the materials to be fastened.

Referring now to Fig. 2, the numeral 34 indicates a metal sheet or flange which is preferably provided with a dimpled portion 36 and a central hole 38 for the attachment of a fabric or other sheet of covering material 40 thereto. In the modification shown the numeral 40 indicates a fabric suitable for the covering of aircraft control surfaces and the like, but it will be understood that the rivet of the present invention is equally applicable for the fastening of two or more sheets of metallic or other material. The rivet blank 10 is preferably formed from aluminum or an aluminum alloy having satisfactory cold working qualities suitable for use in aircraft construction, although it can be made of other materials which may also have the desired characteristics. The mandrel 20 is, on the other hand, formed from a piece of steel or other hard material in order that the mandrel may be used over and over and does not become chipped or scored in the course of frequent or rough handling. It should also be noted that in the united relationship of the rivet 10 and its mandrel 20 the swaged inner end 16 of the rivet is protected behind and inside the diameter defined by the shank 22 and the outer edge of the shoulder 28 which forms the base of the conic pointed portion 26.

Let us now assume that a metallic sheet 34, dimpled as at 36 and having a centrally located hole 38, has applied thereover a sheet of fabric covering 40 which it is desired be fastened to the sheet 34. As the fabric 40 is drawn taut across the metallic sheet 34 it will lie in a flat plane and will be separated from the dimpled portion 36 and the hole 38. The rivet-mandrel combination is then brought into contact with the fabric 40 above the hole 38 and the pointed end 30 forced or pierced through the fabric and into the dimpled hole such that the fabric has formed therein a hole 42 of substantially the same diameter as the dimpled hole 38. This hole will correspond closely to the outside diameter of the rivet shank portion 12 and the adjacent fabric is pressed into the dimpled portion of the sheet by the curved undersurface of the head 14 of the rivet.

When the rivet-mandrel unit has been positioned within the dimpled hole 38 as shown in Fig. 2, the outer flat face of the rivet head portion 14 will lie substantially flush with the outer surface of the fabric 40 and the inner end 16 of the swaged portion of the rivet wall 12 will extend inside or beyond the edge of the hole 38. A riveting or upsetting tool of suitable type is then brought into engagement with both the outer face of the rivet head and with one or more of the grooves 32 in the upper portion of the mandrel 20. The upsetting tool has not been shown inasmuch as a number of satisfactory types are now available and the tool per se does not form a novel part of the present modification. It will be sufficient to explain, however, that these tools are such that they withdraw the mandrel 20 upwardly with suitable force while at the same time maintain downward pressure on the face of the rivet head 14.

As the mandrel is withdrawn upwardly and the rivet held within the dimpled opening 38, the shouldered portion 27—28 of the mandrel bears upon the swaged portion 18 of the rivet and its end 16 such that it is collapsed and bulbed laterally and outwardly into the crimped form 44. The end 16 of the rivet shank is drawn inwardly and upwardly such that it is brought into intimate contact with the cylindrical portion of the rivet wall and the edge of the conic shoulder 28 of the mandrel serves as a cutting edge to remove and clinch over any excess wall material and to provide a sheared end as at 46 of substantially the same diameter as the tubular rivet bore 48. Continued movement of the mandrel causes the edge 28 to shear off the end of the softer rivet material such that the mandrel may be entirely removed from the rivet leaving only the hollow portion in contact with the fabric and metal. This rivet upsetting is unique in that the mandrel which can be re-used is not left in the structure. It will be noted that the rivet wall has been bent or upset into a substantially C-shape in which the sheet 34 and the fabric 40 are firmly gripped together and fastened. This gripping action which takes place in a direction normal to the sheets being joined is one of the distinct advantages of the present rivet. Most other hollow blind rivets obtain their gripping action as an incidental supplement of the swelling of the shank before the pin is completely withdrawn. A majority of these prior hollow rivets also leave a portion of the mandrel in the inside of the structure.

Figure 3:
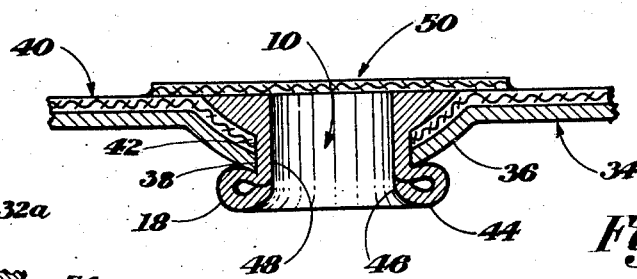
Fig. 3 is a similar elevational view of the upset rivet after the mandrel has been withdrawn and the opening in the rivet covered by a fabric strip.

The hollow driven rivet as shown in Fig. 3 may then be covered either by a single fabric patch 50 or when the rivets occur in a line or row, they may be suitably covered by a strip of pinked tape or fabric which may be doped or cemented to the rivet heads and the adjacent fabric covering 40. When the mandrel 20 has been withdrawn and the swaged portion of the tubular rivet expanded or deformed, the mandrel may be utilized again after removal of the metal ring remaining on the mandrel, by having another rivet blank swaged upon it in the form shown in Fig. 1 and the second and further rivets may be similarly upset by it. The mandrels for a given size rivet accordingly may be utilized over and over again and therefore provide a more economical arrangement than certain existing type hollow rivets which are upset by mandrel rods or wires which are necessarily broken off in the riveting process and either remain in the rivet or are required to be discarded.

Figure 4:
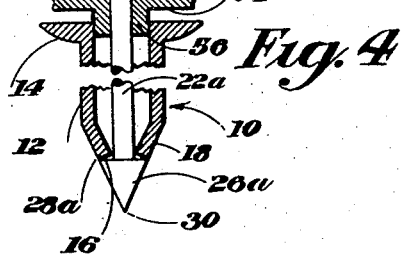
Fig. 4 is a cross-sectional view of a modified form of rivet and mandrel with a portion of the upsetting tool.

In the modification shown in Fig. 4, the rivet blank 10 having a tubular wall portion 12, and a head portion 14, is shown swaged or swedged upon the shank 22a of a simplified form of mandrel 20a. This mandrel is substantially lighter, simpler and cheaper to construct in that it is provided with a shank portion 22a of uniform diameter extending from a conic portion 26a having a point at 30 and a transverse shoulder portion 28a, to the portion at its opposite terminal recessed at 32a for engagement with the upsetting tool. It will be noted that in this modification of the mandrel the part conic portion 24 of Figs. 1 and 2 has been omitted and the swaged wall portion 18 of the rivet blank is turned in against the relatively smaller diameter shank 22a such that the tubular wall ends 16a are protected behind the conic pointed centering boss portion 56 which is adapted to fit snugly within the bore of the rivet serving to centrally maintain the mandrel in its proper axial relationship with respect to the rivet both prior to and during the upsetting operation.

It will accordingly be seen that both modifications of the present rivet are relatively simple in construction and upsetting operation, and particularly in the ease with which the rivet points can be forced through the fabric and into the apertured structure. As shown in both Figs. 2 and 4, the shoulder of the mandrel extends outwardly from the swaged or formed end 16 of the rivet, in such manner that a smooth face is presented to the fabric and there is no possibility of the same being torn or hung up on the edge portion at 28 and 28a of the swaged rivet as the assembly is forced through the fabric. This tendency to tear and hang up has been one of the principal objections to most of the rivets previously available for attachment of fabric to adjacent structure and these objections have been entirely overcome by the disclosed rivet forms.

In most prior hollow rivets of the present type, it was found that a mandrel being drawn through a rivet caused the bottom portion of the rivet to flare principally outwardly. In this manner relatively little squeezing action was imparted along the longitudinal axis of the rivet and consequently pieces of material held together by such prior rivets would not be clamped tightly together. On the other hand, with the present rivet, an axial force is exerted by the mandrel so that the upset portion is moved normal to the sheets and inwardly toward the work to clamp the material tightly together. In other words, it has been found that the present rivet produces a gripping action in a direction normal to the sheets being joined and in these respects overcomes the difficulties and objections of most prior rivets of the blind hollow type.

In each of the modifications shown, the mandrel is completely withdrawn from the rivet in such a manner that it will not be broken off and left in the structure as is the case with a number of prior type rivets. The withdrawal of the mandrel from the form of the rivet shown in Fig. 2 shears off a ring of the rivet material from the end 16 which remains upon the frusto-conical portion 24 of the mandrel, from which it is necessarily removed by cutting or burning prior to the re-use of the mandrel. This extra step is avoided in the modification shown in Fig. 4 in that the ring of metal which remains upon the mandrel shank 22a can readily be slipped off the opposite end of the mandrel over the recessed portion 32a. Similarly the frusto-conical portion 18a of the latter form of rivet can be preformed or preswaged and slipped over the shank of the mandrel without the use of any tools. The centering boss on the upsetting tool in the latter modification, which conforms in diameter to the inside diameter of the rivet, simplifies the upsetting operation in that the mandrel can be held co-axially with the longitudinal axis of the rivet and in this manner the mandrel is also adapted to be withdrawn axially through the rivet in order to provide a uniform upset on the same.

It will accordingly be seen that the novel hollow blind rivet of the present invention may be readily installed, is light in weight and particularly adapted for the attachment of fabric to metal with relatively great utility of the rivet material and continued use of the mandrel element. It also provides a hollow rivet of good strength qualities and one which can be readily drilled out of the structure when it is desired to be removed without injury to the hole.

Other forms and modifications of the present rivet and the method of its application which will become apparent to those skilled in the art after reading the present specification are intended to fall within the scope and spirit of the present invention as more particularly set forth in the appended claims.

I claim:

1. A pulling head mandrel for the blind riveting of a tubular rivet blank having an integral head and a tubular shank portion, said mandrel comprising a cylindrical body portion terminating in a pointed end, a tapered recess portion formed between the said pointed end and the main body portion of said mandrel adapted to receive an inwardly swaged terminal of the tubular shank portion of said rivet blank in a rigidly fixed pre-assembled relationship preventing relative axial movement of said mandrel with respect to said rivet blank in either direction without deformation of the tubular wall portion of said rivet blank, the main cylindrical body portion of said mandrel being adapted to be telescopingly fitted closely within said tubular rivet shank portion in contact with substantially the co-extensive axial length thereof, and means formed adjacent the opposite terminal of said pulling head mandrel adapted for engagement by a pulling tool for the withdrawal of said mandrel from the rivet and the upsetting of said tubular rivet blank.

2. The method of blind riveting a fabric covering material to a supporting element comprising the steps of swaging the shank portion of a headed tubular rivet blank upon a tapered recessed portion of a pointed cylindrical mandrel to form a pre-assembled mandrel-rivet blank unit in which each is rigidly fixed to the other, forming a dimpled hole within said supporting element, applying a fabric covering material upon said supporting element and across said dimpled hole, inserting the pointed end portion of said mandrel with its preassembled swagingly-attached rivet blank through the said fabric covering material into said hole in said supporting element, applying an upsetting tool to the opposite end of said mandrel-rivet blank unit and completely withdrawing the said mandrel in intact condition from the said rivet blank by axially pulling the mandrel out of the rivet through its headed end so that the swaged portion of said rivet blank is outwardly and axially deformed and upset into clinching relationship with said fabric covering material and supporting element.

3. A new article of manufacture adapted for blind riveting comprising a unitary rivet blank and upsetting mandrel, said rivet blank having an integral head and a tubular shank portion, said upsetting mandrel having a cylindrical body portion terminating in a pointed end, a tapered recess formed between the said pointed end and the body portion of said mandrel arranged to receive an inwardly swaged terminal of the tubular shank portion of said rivet blank in a rigidly fixed pre-assembled relationship preventing relative axial movement of the said mandrel with respect to said rivet blank in either direction without deformation of the said swaged tubular wall portion of said rivet blank, the body portion of said mandrel telescopingly fitting closely within said tubular rivet shank portion in substantially co-extensive contact throughout the length thereof, and means carried adjacent the other terminal of said mandrel opposite said pointed end adapted for engagement by a pulling tool for the withdrawal of said mandrel and the upsetting of said tubular rivet.

4. Rivet means of the class described comprising, a rivet blank having an integral head and a tubular shank portion, an upsetting mandrel having a cylindrical body portion terminating in a pointed end, a recessed portion formed between the said pointed end and main body portion of said mandrel arranged to receive an inwardly swaged terminal of the tubular shank portion of said rivet blank in a rigidly fixed pre-assembled relationship preventing relative axial movement of said mandrel with respect to said rivet blank in either direction without deformation of the tubular wall portion of said rivet blank, the body portion of said mandrel telescopingly fitted closely within said tubular rivet shank portion in substantially co-extensive contact therewith throughout the length thereof, and means carried adjacent the other terminal of said mandrel opposite said pointed end for engagement by a pulling tool for the withdrawal of said mandrel and the upsetting of said tubular rivet.

ALFRED THORNGREN.

REFERENCES CITED

The following references are of record in the file of this patent:

UNITED STATES PATENTS

| Number | Name | Date |
|---|---|---|
| 1,829,696 | Wylie | Aug. 18, 1932 |
| 2,114,493 | Huck | Apr. 19, 1938 |
| 2,205,772 | Bowersox | June 25, 1940 |

FOREIGN PATENTS

| Number | Country | Date |
|---|---|---|
| 362,343 | Italy | Aug. 23, 1938 |
| 378,617 | Great Britain | Aug. 18, 1932 |
| 626,483 | France | May 14, 1927 |